3,150,042
TREATING COCCIDIOSIS WITH LINCOMYCIN
Ronald E. Bloss and Robert E. Kohls, Portage Township, Kalamazoo County, Mich., assignors to The Upjohn Company, Kalamazoo, Mich., a corporation of Delaware
No Drawing. Filed Mar. 15, 1963, Ser. No. 265,349
5 Claims. (Cl. 167—53.1)

This invention relates to a process of treatment in veterinery medicine. More particularly, this invention relates to a new and useful process for the prophylactic and therapeutic treatment of coccidiosis in animals by the administration of lincomycin.

Coccidiosis is a disease caused by a parasitic protozoan of the class Sporozoa, order Coccidia. The protozoan in the parasitic stage of the life cycle infests the intestinal tract of the host animals. The disease is encountered in the raising of animals for meat; such as cattle, sheep, swine and poultry, animals raised for fur, such as mink, as well as animals kept as pets, such as dogs and cats.

It has now been discovered, in accordance with the present invention, that therapeutic treatment of coccidiosis can be accomplished by the administration of lincomycin to an animal hosting a coccidial parasite as well as prophylactic treatment for animals subject to infection. For example, cattle infected with *E. zurnii, E. bovis, E. illipsoidalis;* sheep and goats with *E. parva, E. faurei;* swine with *E. debliecki, E. scabra,* and *Isospora suis;* dogs and cats with *Isospora bigemina, Isospora felis, Eimeria canis, Eimeria felina;* poultry with *E. Tenella;* rabbits with *E. stiedae, E. perforans;* and mink with *E. mustelae* can be treated.

As used in the specification and claims the term "lincomycin" shall be taken to mean lincomycin free base and the pharmacologically acceptable acid addition salts thereof.

Lincomycin and the salts thereof can be prepared as described in South African Patent No. 2,184/62; Belgian Patent No. 619,645; and U.S. application No. 121,696, filed July 3, 1961, now Patent No. 3,086,912.

Unless otherwise specified, all percentages and other ratios are given on a weight to weight basis. The pounds (lb.) and ton weights given are avoirdupois units.

Lincomycin can be administered to the host animal by the oral and parenteral routes. Lincomycin can be administered in the pure form, however, it is more convenient if it is administered in combination with a carrier, a feed or the drinking water. Preferably the administration of lincomycin is accomplished in association with a solid or fluid carrier, advantageously in unit dosage form or in association with the feed.

The amount of lincomycin for administration is determined with regard to the species of the host animal and the animal's weight. The following table illustrates the dosage range of the lincomycin to be administered for representative animals in mg. of lincomycin/kg. of body weight:

| Animals | Dose (mg./kg.) | Preferred (mg./kg.) |
| --- | --- | --- |
| Cattle | 1–10 | 3 |
| Sheep | 1–10 | 3 |
| Goats | 1–10 | 3 |
| Swine | 10–200 | 50 |
| Dogs | 10–200 | 50 |
| Cats | 10–200 | 50 |
| Rabbits | 10–150 | 50 |
| Mink | 10–150 | 50 |
| Chickens | 5–50 | 20 |
| Turkeys | 5–50 | 20 |
| Geese | 5–50 | 20 |
| Ducks | 5–50 | 20 |

For oral administration either solid or fluid unit dosage forms can be prepared. For preparing solid compositions such as tablets and capsules, lincomycin is mixed with conventional solid carriers such as talc, magnesium stearate, dicalcium phosphate, starch, lactose and functionally similar materials and pressed into tablet form or filled into gelatin capsules. Fluid dosage forms to be administered as a drench are prepared by dispersing lincomycin into a fluid carrier such as milk, water or syrup.

For parenteral administration, fluid unit dosage forms are prepared utilizing lincomycin and a sterile vehicle, water being preferred. The lincomycin, depending on the form and concentration used, can be either suspended or dissolved in the vehicle. In preparing solutions a water-soluble lincomycin can be dissolved in water for injection and filter sterilized before filling into a suitable vial or ampoule and sealing. Advantageously adjuvants such as a local anethetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the lincomycin is suspended in the vehicle instead of being dissolved and sterilization cannot be accomplished by filtration. The lincomycin can be sterilized by exposure to ethylene oxide before suspending in the sterile vehicle. Advantageously, a surfactant or wetting agent is included in the composition to facilitate uniform distribution of the lincomycin.

Lincomycin feeds are prepared by simply mixing the lincomycin into the animal's regular feed. Advantageously, the lincomycin is supplied in the form of a premix wherein the concentration is 1000 to 2000 times greater than the desired concentration in the feed whereby it is possible to add 1 to 2 lb. of premix to a ton of feed. A different embodiment of premix composition is a premix comprising lincomycin in combination with a non-toxic, solid, water-soluble diluent, the premix designed for addition to the animals drinking water.

*Example 1*

1000 tablets for treating coccidiosis in small animals is prepared from the following types and amounts of ingredients:

| | Gm. |
| --- | --- |
| Lincomycin hydrochloride | 50 |
| Lactose | 125 |
| Corn starch | 65 |
| Magnesium stearate | 25 |

The ingredients are thoroughly mixed and slugged. The slugs are broken down by forcing through a number 16 screen. The resulting granules are then compressed into tablets, each tablet containing 50 mg. of lincomycin hydrochloride.

The tablets so prepared are useful in treating coccidial infection in dogs, cats, and rabbits when administered orally at a dose of 1 tablet/kg. of animal weight per day.

*Example 2*

A sterile aqueous solution for intramuscular use, containing in 1 cc. 200 mg. of lincomycin hydrochloride is prepared from the following types and amounts of ingredients:

| | | |
| --- | --- | --- |
| Lincomycin hydrochloride | gm | 200 |
| Lidocaine hydrochloride | gm | 4 |
| Methylparaben | gm | 2.5 |
| Propylparaben | gm | 0.17 |
| Water for injection, q. s. | cc | 1000 |

The ingredients are dissolved in the water and the solution sterilized by filtration. The sterile solution is filled into vials and the vials sealed.

The solution is useful in the therapeutic treatment of coccidial infections of the following animals at the following daily dosage schedule:

| | |
|---|---|
| Cattle | 1 cc./100 lb. |
| Sheep and goats | 0.25 cc./10 lb. |
| Mink | 0.1 cc./1 lb. |

*Example 3*

A feed for treating coccidiosis in cattle is prepared from the following types and amounts of ingredients:

| | Percent |
|---|---|
| Ground ear corn | 89.75 |
| Soybean oil meal, 44% | 9.0 |
| Ground limestone | 0.7 |
| Salt | 0.5 |
| Trace mineral mixture [1] | 0.05 |

[1] Contains the following percent of minerals: Mn, 12; Co, 0.08; Fe, 5.0; Cu, 0.4; I, 0.24; Zn, 0.7.

To 999 parts of the preceding feed is added 1 part of a premix composition prepared by mixing 200 gm. of lincomycin with sufficient wheat flour to make 1 pound.

The feeding composition so prepared supplies 200 mg. of lincomycin per pound, or about 440 parts per million.

Cattle infected with coccidia are fed 1 lb./day of the above feed for each 100 lb. of body weight.

Similarly the feed can be fed to cattle as a prophylatic measure for the prevention of coccidial infection.

*Example 4*

A feed for treating chicken infested with *E. tenella* is prepared from the following types and amounts of ingredients:

| | Percent |
|---|---|
| Yellow corn meal | 67.35 |
| Soybean oil meal | 24.00 |
| Menhaden fish metal | 6.00 |
| Steamed bone meal | 1.00 |
| Ground limestone | 1.00 |
| Iodized salt | .34 |
| 25% choline chloride | .13 |
| Vitamin B$_{12}$ supplement (6 mg./lb.) | .10 |
| Manganese sulfate | .02 |
| Supplemental vitamin mix [1] | .06 |

[1] Consisting of 16.0 gm. vitamin A supplement (10 units/mg.); 3.6 gm. vitamin D$_3$ supplement (15,000 units/gm.); 7.1 gm. riboflavin supplement (1 gm. riboflavin per ounce); 500 mg. niacin.

To 999 parts of the preceding feed is added 1 part of a premix composition prepared by mixing 56.7 gm. lincomycin with sufficient soybean mill feed to make 1 pound.

The feeding composition so prepared supplies 56.7 mg. of lincomycin per pound, or about 102 parts per million.

The foregoing composition is usefully fed ad. lib. to chickens infected with *E. tenella*. Similarly the composition can be fed to turkeys, ducks and geese, hosting coccidia.

Similarly, the composition can be fed to poultry for the prevention of coccidial infection.

*Example 5*

A feed for treating coccidiosis in swine is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bone meal | 0.5 |
| Salt | 0.5 |
| Trace mineral mixture [1] | 0.05 |
| Zinc oxide | 0.01 |
| Vitamin A and D supplement [2] | 0.22 |
| B vitamin supplement [3] | 0.04 |
| Vitamin B$_{12}$ supplement [4] | 0.08 |

[1] Contains the following percent of minerals: Mn, 12; Co, 0.08; Fe, 5.0; Cu, 0.4; I, 0.24; Zn, 0.7.
[2] Contains 300 USP units D$_3$/gm. and 1500 I.U.A./gm.
[3] Contains per lb.: riboflavin, 2000 mg.; calcium pantothenate, 4000 mg.; niacin, 9000 mg.; and choline chloride, 10,000 mg.
[4] Contains 6 mg. vitamin B$_{12}$ per lb.

To 999 parts of the preceding feed is added 1 part of a premix composition prepared by mixing 300 gm. of lincomycin with sufficient ground limestone to make one pound.

The feeding composition so prepared supplies 300 mg. of lincomycin per pound, or about 660 parts per million.

The foregoing composition is usefully fed to hogs infected with coccidia at 2-lb./day for each 50 lb. of body weight.

Similarly, the composition can be fed to hogs for the prevention of coccidial infections.

What is claimed is:

1. A process for treating coccidiosis in the gastro-intestinal tract of an infected animal comprising the administration to an animal hosting a coccidial infection a therapeutically effective amount of lincomycin.

2. A process for treating coccidiosis in the gastro-intestinal tract of an infected animal comprising the oral administration to an animal hosting a coccidial infection a therapeutically effective amount of lincomycin.

3. A process for treating coccidiosis in the gastro-intestinal tract of an infected animal comprising the administration to an animal hosting a coccidial infection from about 1 mg./kg. to about 200 mg./kg. of lincomycin.

4. A process for treating coccidiosis in the gastro-intestinal tract of an infected animal comprising the oral administration to an animal hosting a coccidial infection from about 1 mg./kg. to about 200 mg./kg. of lincomycin.

5. A process for treating coccidiosis in poultry comprising the oral administration to poultry hosting a coccidial infection of from about 5 mg./kg. to about 50 mg./kg. of lincomycin, said lincomycin administered in combination with a poultry feed.

References Cited in the file of this patent

UNITED STATES PATENTS 3,086,912   Bergy _____ Apr. 23, 1963